Sept. 18, 1951     H. PFENNINGER     2,568,024
COMBINED STEAM GENERATOR AND COMBUSTION
GAS TURBINE POWER PLANT
Filed May 9, 1949
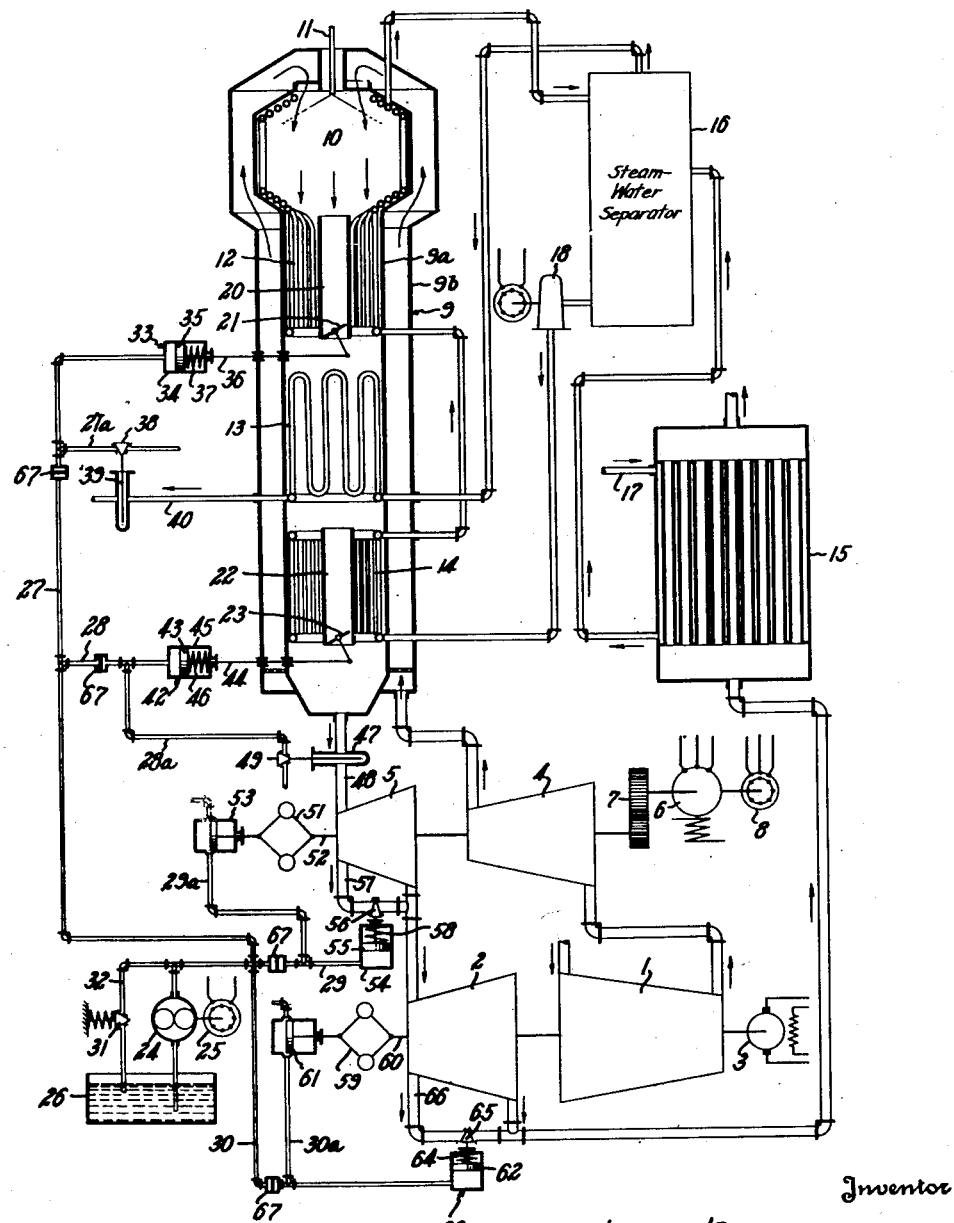
Inventor
Hans Pfenninger
By Pierce, Scheffler & Parker
Attorneys Patented Sept. 18, 1951

2,568,024

UNITED STATES PATENT OFFICE 2,568,024

COMBINED STEAM GENERATOR AND COMBUSTION GAS TURBINE POWER PLANT

Hans Pfenninger, Baden, Switzerland, assignor to Aktiengesellschaft Brown, Boveri & Cie, Baden, Switzerland, a joint-stock company Application May 9, 1949, Serial No. 92,224
In Switzerland December 13, 1948

11 Claims. (Cl. 60—49)

The present invention relates in general to power plants and in particular to steam plants of the type including a combustion chamber operated at super-atmospheric pressure, associated heat exchange tubes for converting water to steam, and a charging group for the combustion chamber comprised of a compressor for compressing air that is delivered at superatmospheric pressure and a turbine coupled thereto which is driven by the combustion gases as the latter leave the combustion chamber. This general arrangement is not only considered highly efficient but it also makes it possible to build a plant having a high output with relatively small overall external dimensions since the heat exchange surfaces can be of relatively small size.

In one known plant arrangement of this general type, the combustion gases are caused to flow at very high speeds through the heat exchange surfaces. After the combustion gases have lost the greater part of their initial heat and pressure to the heat exchange surfaces in the generation of steam, they are passed to the turbine which drives the air compressor. Usually enough energy remains in the combustion gases to supply all power necessary to drive the compressor. However, it is the practice to couple an electric motor or small auxiliary steam turbine run by the generated steam to the turbine-compressor shaft to supply any additional power that may become necessary should the available power output of the turbine be insufficient to supply the entire power needs of the compressor. In such a plant, the energy of compression in the combustion gases is principally used for imparting a high speed to these gases to obtain the high rate of heat transfer to the heat exchange surfaces.

In accordance with this invention, however, the steam plant components are designed in such manner that the compression energy imparted by the compressor to the air admitted to the combustion chamber is not used for producing high combustion gas speeds but on the contrary is converted for the greater part by the charging turbine into useful power, i. e. power in excess of that consumed in driving the compressor. To achieve this result, the pressure drop of the combustion gases in the steam generator is kept as low as possible by avoiding all unnecessary deflections of the gases while passing by the heat exchange surfaces in the generator, and means are provided for regulating both the combustion gas temperature and the steam temperature to prevent excessive operating temperatures which otherwise might cause serious damage to the combustion gas turbine and the steam turbine driven by the steam produced. However, in the interest of obtaining maximum operating efficiency, the gas and steam temperatures should be so scheduled that they approach the maximum limit allowable for the structural materials used at the gas inlet to the turbine, the discharge end of the steam generator and the steam inlet to the steam turbine. By so doing, maximum fuel efficiency will be assured.

A preferred structural embodiment of the invention is illustrated in the single view presented in the accompanying drawing. The improved combustion chamber and steam generator construction is illustrated in vertical, central section but the other essential components of the plant have been shown more or less diagrammatically by conventional symbols to simplify the drawing.

Referring now to the drawing, the plant components include a low pressure stage compressor 1 coupled to and driven by a low pressure stage gas turbine 2. On the shafting connecting the compressor and turbine is preferably mounted a starting motor 3 preferably of the direct current type. As will be later explained, the compressor 1 is driven at a variable speed, drawing in air at atmospheric pressure and compressing the same to an intermediate pressure. The air at the output of compressor 1 is then passed to a second, high pressure stage compressor 4 which further increases its pressure. Compressor 4 is likewise coupled to and driven by a second, high pressure stage gas turbine 5, and this compressor-turbine group which is arranged to be driven at a constant speed serves also to provide a useful power output, it being observed that the power developed in the turbine in excess of that absorbed by the compressor is used for driving an alternating current generator 6 over gearing 7. As with the low pressure stage turbine-compressor group, a motor 8 preferably of the alternating current type is mounted on the generator shafting for starting the high pressure stage turbine 5, compressor 4 group.

The combustion chamber and steam generator components are structurally combined in an elongated double walled housing 9 of circular cross-section which is usually mounted vertically. Air from compressor 4 is passed upwardly through the annular space between the inner and outer shells 9a, 9b of the housing taking on more heat since it cools the hot inner wall 9a. After the air reaches the top portion of the casing, which portion is of slightly larger diameter than the remainder to provide a comparatively large volume combustion chamber 10 within the inner wall 9a, it enters the latter, flowing downwardly as indicated by the arrows and is mixed with fuel entering through nozzle 11 to form hot combustion gases under a continuous ignition process. These combustion gases then flow downwardly through the inner shell 9a constituting the steam generator housing past an upper vaporizer consisting of a series of water tubes 12 lining the upper end of the inner shell 9a and part of the combustion chamber 10 proper as well, a steam superheater consisting of a series of interconnected tubes 13, and finally a lower vaporizer consisting of a series of water tubes 14 lining the inner shell 9a at the lower end thereof. After leaving the lower vaporizer unit 14, the combustion gases are passed first to the high pressure stage turbine 5, thence through the low pressure stage turbine 2 and finally through a feed water preheater 15. By now all of the available energy in the gases will have been utilized and the gases are accordingly exhausted to atmosphere.

By splitting up the total vaporizing surfaces available into upper and lower tube sections 12 and 14 with the superheater 13 inserted between the two vaporizer sections, one is able, for a given combustion gas temperature in front of the turbine, to attain the highest possible fresh steam temperature, and the straight line arrangement of the vaporizer sections 12, 14 and the superheater 13 makes it possible to pass the combustion gases to the turbine 5 with a minimum loss in pressure. The steam side of the power plant is completed by a water-steam seperator 16 of known construction and the feed water preheater 15 previously mentioned.

Feed-water brought to the pressure of the steam generator in a feed pump, not illustrated, enters the feed water preheater 15 at inlet pipe 17. Some of the water will be converted into steam in the preheater and the water-steam mixture is then passed to the water-steam separator 16. The water content leaves the lower end of the separator 16 and is forced by pump 18 through the lower and upper vaporizer sections 14 and 12 in succession and is then returned to the separator 16 where any remaining water is separated out and recycled through the vaporizers. The steam produced by the vaporizers and that produced in the preheater 15 then passes out of the upper end of the separator in a saturated state and into the superheater 13 where its temperature is further increased, and thence out of the latter to the steam load which may for example be constituted by a steam turbine, not illustrated.

In accordance with the invention, means are provided for regulating the temperature of the combustion gases at the outlet of the steam generator, i. e., the inlet to gas turbine 5, and preferably also for regulating the temperture of the combustion gases in the steam generator immediately in advance of the superheater 13 to thereby regulate the fresh steam temperature. Generally speaking, the two controls are similar and each is adapted to pass a larger or smaller amount of the total volume of combustion gases as the condition may require in heat exchange relation with the vaporizer tube sections 12 and 14. For this purpose the upper vaporizer section 12 contains an axially disposed by-pass tube 20 the lower end of which is provided with a throttle valve 21 of the pivoted flap type and the lower vaporizer section 14 is similarly provided with an axially disposed by-pass tube 22 whose lower end is opened and closed by a throttle valve 23 which is likewise of the pivoted flap type.

It will be self-evident from the drawing that as the throttle valves 21 and 23 are opened and closed, more or less of the combustion gases flowing downwardly from the combustion chamber 10 will be by-passed through the tubes 20 and 22 thus regulating the amount of heat given up by the combustion gases to the vaporizer sections 12 and 14. Thus by opening and closing valve 21, the mean temperature of the combustion gases at the point where they enter the steam superheater tube section 13 can be regulated, and thereby the temperature of the superheated fresh steam also, to prevent possible damage to the steam turbine or other load device supplied by the fresh steam. Preferably the dimensions of the vaporizer section 12 and tube 20 are so selected that valve 21 will be about half open when the load on the steam generator is normal.

In a similar manner, by opening and closing valve 23, the mean temperature of the combustion gases at the point where they enter the turbine 5 can be regulated to prevent damaging over-temperature conditions from arising in the turbine. As with the preceding control, the dimensions of the vaporizer section 14 and tube 22 are so selected that valve 23 will be partly open when the combustion gas temperature at the inlet to turbine 5 is at the proper level.

Control of the valves 21 and 23 is preferably effected by means of an auxiliary, oil pressure type servosystem including oil pressure responsive servomotors coupled to the valves and gas temperature responsive means for varying the oil pressure at the servomotors.

The oil pressure system includes a positive displacement type pump 24 driven at a constant speed by motor 25, which draws oil from sump 26 and delivers the same to the oil distribution lines 27, 28, 29 and 30. Oil line pressure is maintained constant by a spring loaded valve 31 common to all the distribution lines and which is placed in a line 32 leading from the outlet of pump 24 back to the sump 26.

Oil line 27 terminates at a servomotor 33 comprised of an oil cylinder 34, a piston 35 coupled by linkage 36 to valve 21, and a spring 37 which applies a loading pressure against one side of piston 35 in opposition to and balancing the oil pressure from line 27 applied against the other side of the piston. It will be recalled that the purpose of valve 21 is to regulate the temperature of the superheated steam to the end that it will neither rise to a dangerously high level nor fall below a satisfactory operating level. Consequently, adjustment of valve 21 is made in accordance with temperature of the superheated steam, i. e. the oil pressure against piston 35 of servomotor 33 must be regulated in accordance with the steam temperature. To accomplish this, oil line 27 includes a branch bleed line 27a leading back to the sump 26, oil flow through the bleed line 27a being controlled by a valve 38 the operation of which is in turn controlled by a temperature responsive servodevice 39 which can be a bimetallic thermostat placed in the steam line 40 leading from superheater 13 to the steam load.

Should the fresh steam temperature in line 40 rise above the level preselected and which level determines the initial setting of the flap valve 21, the bimetallic thermostat 39 will expand axially to move valve 38 to a more open position thus bleeding oil from line 27 at a higher rate and lowering the oil pressure applied against piston 35 of servomotor 33 whereupon the loading spring 37 will shift the piston to the left and hence move flap valve 21 to a more closed position, as regards the by-pass pipe 20. This in turn causes a larger portion of the combustion gases to flow over the vaporizer tubes 12. The gases thus give up more heat to the tubes and enter the superheater 13 at a lower temperature thereby also lowering the rate of heat transfer to the superheater and the amount of superheating imparted to the fresh steam.

Conversely, a drop in temperature of the fresh steam below the level desired to be maintained causes the flap valve 21 to move to a more open position which thereby raises the combustion gas temperature at the entrance to superheater 13, and hence also the amount of heat used for superheating the fresh steam.

The same general type of oil pressure responsive servocontrol is used for automatically adjusting the angular position of flap valve 23 at the lower end of by-pass tube 22 for the lower vaporizer tubes 14 in order to maintain a selected temperature level for the combustion gases at the entrance to the power turbine 5. This servosystem which operates from the oil line 28 is comprised of servomotor 42, the piston 43 of which is coupled to flap valve 23 by linkage 44, oil cylinder 45 and loading spring 46. A bimetallic thermostat 47 in the gas line 48 connecting the gas outlet at the lower end of the steam generator housing 9 with the gas inlet to the power take-off turbine 5 serves to adjust a valve 49 in the bleed line 28a in accordance with the gas temperature in line 48 to provide the necessary regulation of oil pressure in line 28 and hence the pressure applied against servopiston 43. Thus any rise in temperature of the combustion gases in line 48 above the selected level will cause flap valve 23 to move to a more closed position thus effecting a higher rate of heat transfer to vaporizer tubes 14 and lowering the combustion gas temperature at the exit of housing 9. Conversely, a drop in combustion gas temperature below the selected level will cause valve 23 to move to a more open position thus by-passing a larger amount of the combustion gases through tube 22 and raising the combustion gas temperature.

Both compressor-turbine groups are likewise provided with centrifugal regulators to prevent them from racing in the event that the load should be suddenly removed or in the event of a break in the steam line which would drop the steam generator load from the combustion gases. As regards the power group, it will be seen that a ball type centrifugal governor 51 is driven from the shaft 52 of turbine 5 and that the governor is coupled to valve 53 located in an oil bleed line 29a tapped to oil line 29 in advance of a servomotor 54. Piston 55 of the latter is coupled to a valve 56 located in a by-pass gas line 57 between the gas inlet and outlet of turbine 5. The servopiston 55 is loaded by a spring 58 against the oil pressure in line 29 and regulation of the speed is effected by discharge through the bleed line 29a. That is, should the speed of the power turbine 5 rise above a predetermined maximum safe value, governor 51 will move valve 53 to the right thus initiating oil discharge through line 29a and dropping the oil pressure in line 29. Servopiston 55 is then moved downwardly by the spring 58 thus moving valve 56 to an open position and permitting the combustion gases to discharge through the by-pass duct 57 around turbine 5. The governor operates only after the maximum permissible speed has been exceeded. It has no regulating effect within normal speed changes due to normal changes in load.

Substantially the same type of protection is provided for the other turbine 2 and the charging compressor 1 which it drives, there being a ball type governor 59 driven off shaft 60, the governor controlling valve 61 in oil bleed line 30a to vary the oil pressure in line 30 which is applied to the piston 62 of servomotor 63, the piston 62 being loaded by spring 64 and connected to valve 65 in a bypass gas line 66 around turbine 2.

Finally it will be observed that each of the oil distribution lines 27—30 contains an oil throttling orifice 67 of a fixed size in advance of the branch oil lines 27a—30a.

The manner in which the power plant operates should be clear from what already has been said in connection with the detailed description of the component parts of the plant and hence no further detailed explanation is considered necessary. In closing, however, it would be well to note that use of the two turbines as illustrated each of which drives a compressor makes it practical to supply power to an alternating current network from an alternating current generator driven at a constant speed from one of the turbines and, at the same time, to regulate the quantity of the air pumped by the charging compressors by driving one of them at a variable speed from the other turbine in accordance with the loading on the steam generator side of the plant. In this connection, it should be made clear that the direct current motor 3 serves not only as a starter for the compressor 1-turbine 2 group but is also employed to furnish a driving torque to the group assisting that which is supplied by turbine 2 while the power plant is in operation in order that the speed of the compressor 1 may be varied to suit the load conditions on the steam generator.

In conclusion, I wish it to be understood that while the embodiment of the invention as illustrated in the drawing is preferred, various minor departures therefrom in the construction and arrangement of component parts may be made without, however, departing from the spirit and scope of the invention as defined in the appended claims.

I claim:

1. A combined steam generator and combustion gas turbine power plant comprising a combustion chamber with fuel supply for producing combustion gases at superatmospheric pressure, an elongated straight steam generator housing connected at one end thereof to the combustion gas outlet from said combustion chamber, said housing enclosing a first vaporizer section, a steam superheater section and a second vaporizer section arranged in consecutive order along the axis of said housing and straight through which said gases pass in heat transfer relation in the order named with a relatively small drop in gas pressure, a power output gas turbine having its gas inlet in communication with the other end of said housing for receiving the combustion gases discharged therefrom, an air compressor driven by said gas turbine, a conduit connecting the compressed air outlet from said compressor with the air inlet to said combustion chamber, and a combustion gas by-pass for said second vaporizer section controlled in accordance with the temperature of said gases at the turbine inlet for varying the extent of the heat transfer from said combustion gases to said second vaporizer section in the same sense as the change in combustion gas temperature.

2. A power plant as defined in claim 1 wherein the combustion gas by-pass for varying the heat transfer from the combustion gases to said second vaporizer section includes a gas by-pass tube extending lengthwise through the latter, and valve means therein actuated in accordance with the temperature of the combustion gases at the turbine inlet for varying the amount of gas flowing through the tube.

3. A power plant as defined in claim 2 wherein the dimensions of the heat transfer surfaces of said second vaporizer section and the by-pass tube associated therewith are so chosen that the combustion gas temperature at the turbine inlet is below the operating level desired to be maintained when said valve means is completely closed.

4. A combined steam generator and combustion gas turbine power plant comprising a combustion chamber with fuel supply for producing combustion gases at superatmospheric pressure, an elongated straight steam generator housing connected at one end thereof to the combustion gas outlet from said combustion chamber, said housing enclosing a first vaporizer section, a steam super-heater section and a second vaporizer section arranged in consecutive order along the axis of said housing and straight through which said gases pass in heat transfer relation in the order named with a relatively small drop in gas pressure, a gas turbine having its gas inlet in communication with the other end of said housing for receiving the combustion gases discharged therefrom, an air compressor driven by said gas turbine, a conduit connecting the compressed air outlet from said compressor with the air inlet to said combustion chamber, a combustion gas by-pass for said second vaporizer section controlled in accordance with the temperature of said gases at the turbine inlet for varying the extent of the heat transfer from said gases to said second vaporizer section in the same sense as the change in combustion gas temperature, and a second combustion gas by-pass for said first vaporizer section controlled in accordance with the temperature of the steam at the steam outlet of said superheater section for varying the extent of the heat transfer from said gases to said first vaporizer section in the same sense as the change in steam temperature.

5. A power plant as defined in claim 4 wherein the respective by-passes for varying the heat transfer from the combustion gases to said first and second vaporizer sections are each constituted by a gas by-pass tube extending through the section and temperature controlled valve means for varying the amount of gas flowing through the tube.

6. A power plant as defined in claim 5 wherein the dimensions of the heat transfer surfaces of said first and second vaporizer sections and the by-pass tubes associated therewith are so chosen that the temperature of the steam at the outlet from said superheater is below the operating level desired to be maintained when the valve means associated with the by-pass tube for the first vaporizer section is completely closed, and the temperature of the combustion gases at the turbine inlet is likewise below the operating level desired to be maintained when the valve means associated with the by-pass tube for the second vaporizer section is completely closed.

7. A combined steam generator and combustion gas turbine power plant comprising high and low pressure stage air compressors arranged in series, high and low pressure stage combustion gas turbines likewise arranged in series and coupled respectively to said high and low pressure compressors, a combustion chamber in communication with the outlet of said high pressure compressor and having a fuel supply for producing combustion gases at superatmospheric pressure, an elongated straight steam generator housing connected at one end thereof to the combustion gas outlet from said combustion chamber, said housing enclosing a first vaporizer section, a steam superheater section and a second vaporizer section arranged in consecutive order along the axis of said housing and straight through which said gases pass in heat transfer relation in the order named with a relatively small drop in gas pressure, a gas passageway connecting the other end of said housing with the inlet to said high pressure stage turbine, a conduit connecting the compressed air outlet from said high pressure stage air compressor with the air inlet to said combustion chamber and a combustion gas by-pass for said second vaporizer section controlled in accordance with the temperature of said gases at the inlet to said high pressure stage turbine for varying the extent of the heat transfer from said combustion gases to said second vaporizer section in the same sense as the change in combustion gas temperature.

8. A combined steam generator and combustion gas turbine power plant comprising high and low pressure stage combustion gas turbines arranged in series, said high pressure turbine being driven at a constant speed and said low pressure turbine being driven at a variable speed dependent on plant load, an air compressor coupled to said low pressure stage turbine, a combustion chamber in communication with said compressor and having a fuel supply for producing combustion gases at superatmospheric pressure, an elongated straight steam generator housing connected at one end thereof to the combustion gas outlet from said combustion chamber, said housing enclosing a first vaporizer section, a steam superheater section and a second vaporizer section arranged in consecutive order along the axis of said housing and straight through which said gases pass in heat transfer relation in the order named in a non-deflected manner with a relatively small drop in gas pressure, a gas passageway connecting the other end of said housing with the inlet to said high pressure stage turbine, and a combustion gas by-pass for said second vaporizer section controlled in accordance with the temperature of said gases at the inlet to said high pressure stage turbine for varying the extent of the heat transfer from said combustion gases to said second vaporizer section in the same sense as the change in combustion gas temperature.

9. A power plant as defined in claim 8 and which further includes a second air compressor arranged in series with the other said compressor and which is coupled to said high pressure stage turbine.

10. A power plant as defined in claim 8 and which further includes a gas by-pass duct around each of said turbines, a valve in each duct for varying the amount of the combustion gases passed therethrough, and a centrifugal governor driven by each turbine for controlling the valve in the by-pass duct associated therewith.

11. A combined steam generator and combustion gas turbine power plant comprising an elongated straight double walled housing, said housing including a combustion chamber with fuel supply for producing combustion gases at superatmospheric pressure, a first vaporizer section, a steam superheater section and a second vaporizer section arranged in consecutive order along the axis of said housing, said combustion gases being passed from said combustion chamber straight through said sections in heat transfer relation thereto in the order named and with a relatively small drop in gas pressure, a power output gas turbine having its gas inlet in communication with the gas outlet end of said housing for receiving the combustion gases discharged therefrom, an air compressor driven by said gas turbine, an air conduit between the compressed air outlet from said compressor and the space between the walls of said housing at the combustion gas outlet end therefrom, an air passageway to the interior of said combustion chamber from the space between the walls of said housing at the other end thereof, and a combustion gas by-pass for said second vaporizer section controlled in accordance with the temperature of said gases at the turbine inlet for varying the extent of the heat transfer from said gases to said second vaporizer section.

HANS PFENNINGER.

REFERENCES CITED

The following references are of record in the file of this patent:

UNITED STATES PATENTS

| Number | Name | Date |
| --- | --- | --- |
| 1,991,114 | Noack | Feb. 12, 1935 |
| 2,060,290 | Ebner | Nov. 10, 1936 |
| 2,110,422 | Norguet | Mar. 8, 1938 |
| 2,115,338 | Lysholm | Apr. 26, 1938 |
| 2,184,845 | Noack | Dec. 26, 1939 |
| 2,203,731 | Keller | June 11, 1940 |
| 2,459,709 | Lysholm | Jan. 18, 1949 |
| 2,495,604 | Salzmann | Jan. 24, 1950 |

FOREIGN PATENTS

| Number | Country | Date |
| --- | --- | --- |
| 469,311 | Great Britain | July 22, 1937 |